(12) United States Patent
Kurosawa (10) Patent No.: US 10,742,883 B2
(45) Date of Patent: Aug. 11, 2020

(54) DATA PROCESSING METHOD FOR GENERATING COMPOSITE IMAGE DATA INDICATING POSITIONAL CHANGES OF AN OBJECT

(71) Applicant: CASIO COMPUTER CO., LTD., Shibuya-ku, Tokyo (JP)

(72) Inventor: Hiroshi Kurosawa, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 33 days.

(21) Appl. No.: 16/137,373

(22) Filed: Sep. 20, 2018

(65) Prior Publication Data

US 2019/0098214 A1    Mar. 28, 2019

(30) Foreign Application Priority Data

Sep. 25, 2017   (JP) ................................. 2017-184197

(51) Int. Cl.
*H04N 5/232* (2006.01)
*H04N 5/262* (2006.01)
*G06T 7/254* (2017.01)

(52) U.S. Cl.
CPC ......... *H04N 5/23245* (2013.01); *G06T 7/254* (2017.01); *H04N 5/23206* (2013.01); *H04N 5/23229* (2013.01); *H04N 5/23293* (2013.01); *H04N 5/2625* (2013.01); *G06T 2207/10016* (2013.01); *G06T 2207/30241* (2013.01)

(58) Field of Classification Search
CPC .......... H04N 5/23245; H04N 5/23293; H04N 5/23229; H04N 5/2625; H04N 5/23206; G06T 7/254; G06T 2207/10016; G06T 2207/30241
See application file for complete search history.

(56) References Cited

U.S. PATENT DOCUMENTS 6,351,545 B1 * 2/2002 Edelson ................. G03B 21/32
                                                      348/155
2015/0178320 A1 * 6/2015 Gao ..................... G06F 16/7335
                                                      707/708

FOREIGN PATENT DOCUMENTS

JP          2001154992 A    6/2001

* cited by examiner

*Primary Examiner* — Padma Haliyur
(74) *Attorney, Agent, or Firm* — Holtz, Holtz & Volek PC (57) ABSTRACT

A data acquisition device including a processor which performs processing of eliminating some of a plurality of position data indicating mutually different positions of a moving object, in accordance with a mode signal from an information processing device, and a communication circuit which transmits the position data subjected to elimination processing by the processor to the information processing device.

6 Claims, 7 Drawing Sheets

EXAMPLE WHERE MOVING SPEED SIGNIFICANTLY CHANGES

COMPOSITE IMAGE OF ALL ACQUIRED IMAGES

FIG. 7B

EXTRACTION OF IMAGES OF OBJECT AT REGULAR TIME INTERVALS (IMAGE ADJUSTMENT PROCESSING)

COMPOSITE IMAGE AFTER IMAGE ADJUSTMENT PROCESSING

FIG. 7C

COMPLEMENT OF POSITIONS OF OBJECT (EQUAL-ADJUSTMENT PROCESSING)

COMPOSITE IMAGE AFTER EQUAL-ADJUSTMENT PROCESSING

DATA PROCESSING METHOD FOR GENERATING COMPOSITE IMAGE DATA INDICATING POSITIONAL CHANGES OF AN OBJECT

CROSS-REFERENCE TO RELATED APPLICATION

This application is based upon and claims the benefit of priority from the prior Japanese Patent Application No. 2017-184197 filed Sep. 25, 2017, the entire contents of which are incorporated herein by reference.

BACKGROUND OF THE INVENTION

1. Field of the Invention

The present invention relates to a data acquisition device that supplies suitable data to an information processing device, an information processing device that provides an instruction to acquire suitable data from a data acquisition device, and a data processing method.

2. Description of the Related Art

As described in Japanese Patent Application Laid-Open (Kokai) Publication No. 2001-154992, electronic desktop calculators capable of not only four arithmetic operations but also various functional calculi (so-called scientific electronic calculators) are known. In recent years, multifunctional-type scientific electronic calculators are also known which have a function of automatically generating a graph or a numerical table based on data detected by an externally connected sensor device or data transmitted from a personal computer and displaying it, a formula manipulation function, a drawing function, and the like (hereinafter referred to as "multifunctional scientific electronic calculators").

In some information processing devices having the function of a multifunctional scientific electronic calculator, based on measurement data of temporal changes in the position of an object detected by an externally connected sensor device and the like, a graph or a numerical table showing changes in the state of the object and the like is generated and displayed on a display section.

Such information processing devices have been used, for example, as learning materials for deepening understanding in the field of mathematics in a school education or as simple measuring devices in research and development sites.

The present invention advantageously provides a data acquisition device that supplies suitable data to an information processing device, an information processing device that provides an instruction to acquire suitable data from a data acquisition device, and a data processing method.

SUMMARY OF THE INVENTION

In accordance with one aspect of the present invention, there is provided a data acquisition device comprising: a processor which performs processing of eliminating some of a plurality of position data indicating mutually different positions of a moving object, in accordance with a mode signal from an information processing device; and a communication circuit which transmits the position data subjected to elimination processing by the processor to the information processing device.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

A learning support device, an information processing method and an information processing program according to the present invention will hereinafter be described in detail with reference to embodiments.

(Learning Support Device)

Figure 1A:
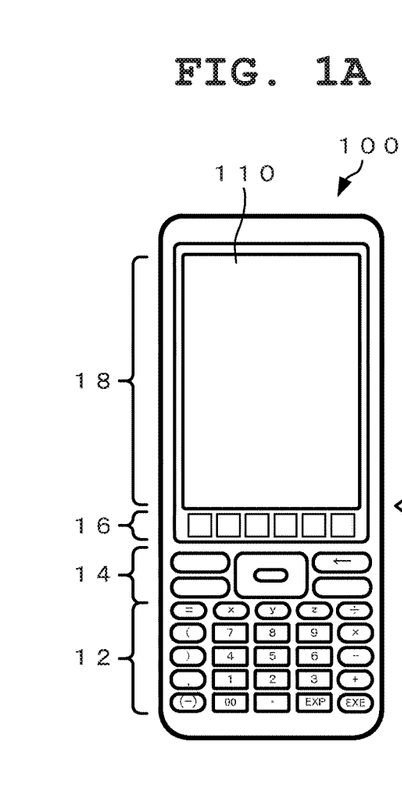
FIG. 1A, FIG. 1B and FIG. 1C are schematic diagrams showing an embodiment of a learning support device according to the present invention.
Figure 1B:
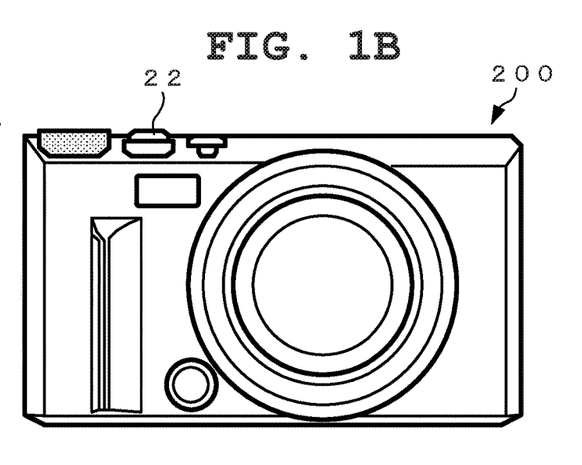
Figure 1C:
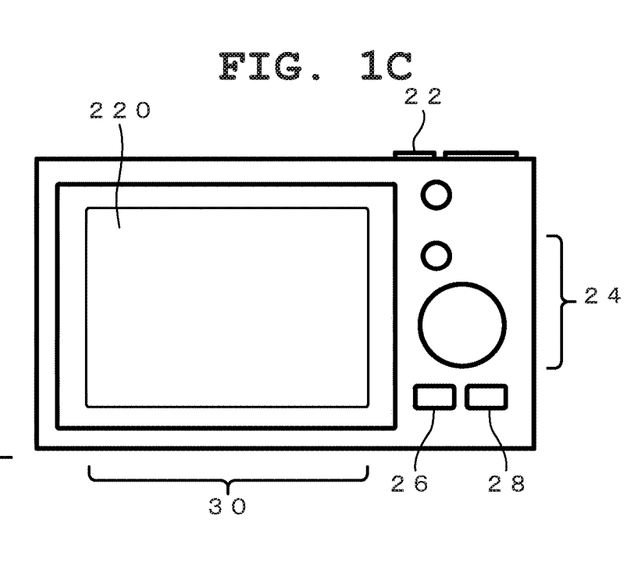
Figure 2:
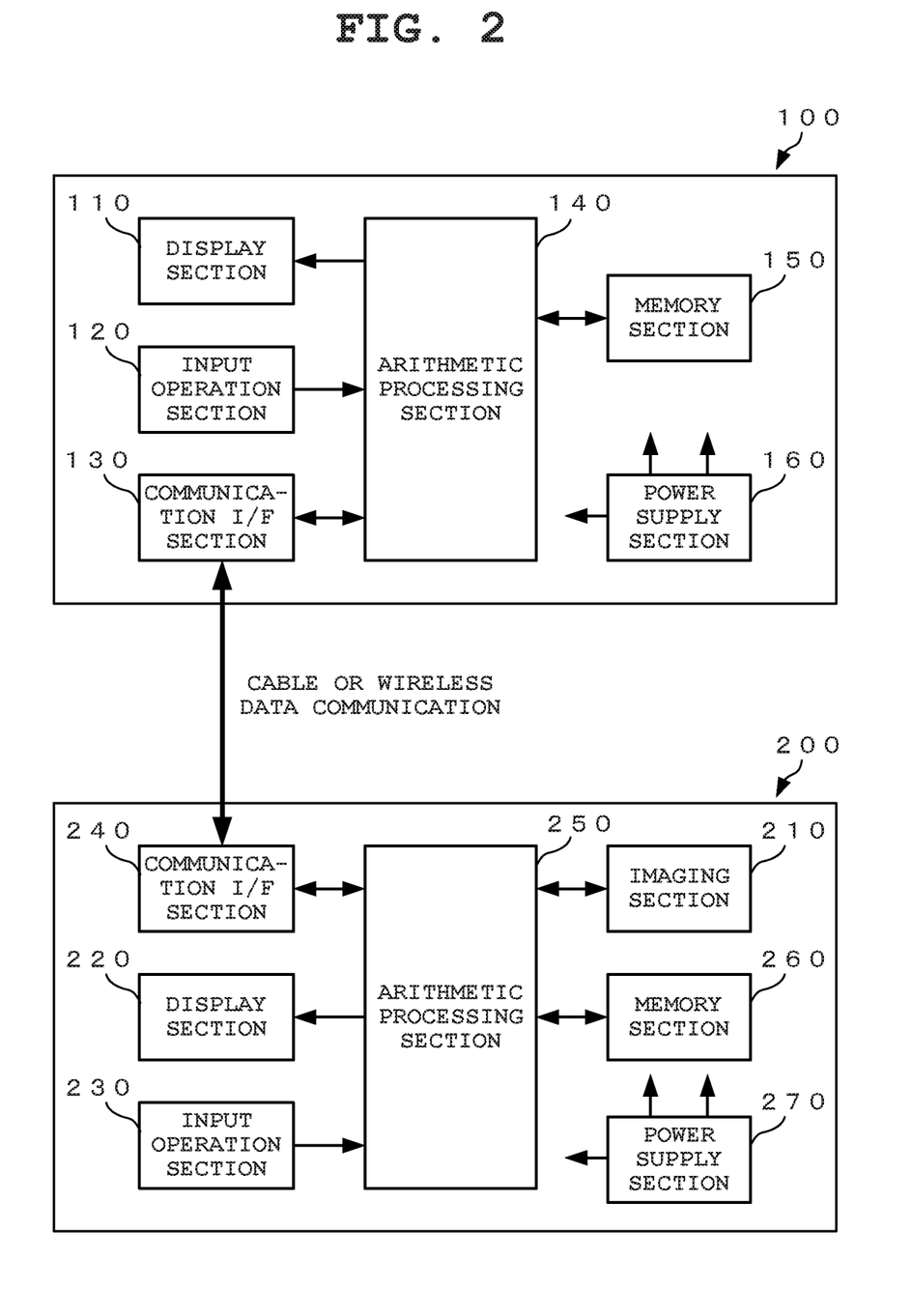
FIG. 2 is a block diagram showing an example of a functional structure applied to the learning support device according to the embodiment.

FIG. 1A to FIG. 1C are schematic diagrams showing an embodiment of a learning support device according to the present invention, of which FIG. 1A shows an example of an information processing device applied to the present embodiment, and FIG. 1B and FIG. 1C are outline views showing an example of an imaging device applied to the present embodiment (the lens mounting surface side, the monitor mounting surface side). FIG. 2 is a block diagram showing an example of a functional structure applied to the learning support device according to the present embodiment. FIG. 2 shows examples of a functional block of the information processing device 100 and a functional block of the imaging device 200.

As shown in FIG. 1A to FIG. 1C, the learning support device according to the present invention includes at least the information processing device 100 and the imaging device 200 as a data acquisition device, which are connected such that data communication can be made through a set communication system.

The information processing device 100 has, in addition to functions of four arithmetic operations and functional calculi, a formula manipulation function, a graph/numerical table generation function, a drawing function, and the like. In particular, the information processing device 100 according to the present embodiment is connected such that data communication can be made with the imaging device 200 or various types of sensor devices, and has a function to generate and display a graph based on image data acquired from the imaging device 200 or measurement data acquired from the sensor devices. Here, as the information processing device 100, for example, the multifunctional scientific electronic calculator described in "BACKGROUND OF THE INVENTION" is favorably applicable. In addition thereto, general-purpose electronic devices having an information processing function, such as high-performance mobile phones (so-called smartphones), tablet terminals and personal computers are also applicable.

The information processing device 100 mainly includes, for example, a display section 110, an input operation section 120, a communication I/F section (hereinafter simply referred to as "communication circuit") 130, an arithmetic processing section 140, a memory section 150, and a power supply section 160, as shown in FIG. 2.

The display section 110 includes a liquid crystal display (LCD), an organic electroluminescent display (ELD), an electronic paper display, or the like, on which letters, numerical expressions, graphs, numerical tables, figures and the like can be displayed. This display section 110 displays various types of information based on an operation performed by the user through the input operation section 120, arithmetic processing in the information processing device 100, and the like.

The input operation section 120 includes, for example, button switches 12 and 14 constituted by hardware keys arranged on an area around the display section 110, a side portion of the housing of the information processing device 100, or the like, touch switches 16 and 18 constituted by software keys applying a touch panel integrally formed with the display section 110, and the like, as shown in FIG. 1A. Here, in the case where a general-purpose multifunctional scientific electronic calculator is applied as the information processing device 100, numeric keys, arithmetic keys for various functional calculi, function keys and menu keys for implementing or setting functions associated with the display of a graph or a numerical table, and the like are provided as the input operation section 120 in the form of hardware keys or software keys, as shown in FIG. 1A. For example, the numeric keys or arithmetic keys include the button switch 12, the function keys include the button switch 14 or the touch switches 16 and 18, and the menu keys include the touch switches 16 and 18. The user operates these switches to perform four arithmetic operations functional calculi, and the like, or to display graphs numerical tables, and the like on the display section 110. Note that a configuration in which the input keys of the information processing device 100 are constituted by only hardware keys or a configuration in which they are constituted by only software keys may be adopted.

The communication circuit 130 functions as an interface to perform data communication at least with the imaging device 200 connected to the information processing device 100, and receives image data acquired from the imaging device 200, image data subjected to image processing, and the like. Here, examples of communication systems applied to the communication circuit 130 include a cable communication system in which data communication is made through a communication cable, and a wireless communication system in which data communication is made through the general-purpose wireless communication standard, such as Wi-Fi (wireless fidelity (registered trademark)), Bluetooth (registered trademark), or near field communication (NFC) as non-contact communication. In addition, in the case where various sensor devices are connected in addition to the imaging device 200, the communication circuit 130 functions as an interface for performing data communication with the sensor devices. Note that the communication circuit 130 may also be connected to a network available to the public, such as the Internet, or to a network available only to a specific organization, such as a company or an educational institution, and functions as an interface for transmitting and receiving data stored in the memory section 150, data stored on the server, and the like to/from the server or the like on the network.

The arithmetic processing section 140 includes a processor, such as CPU (Central Processing Unit) or MPU (Microprocessor) or a computer equipped with a processor, and executes a control program stored in the memory section 150. As a result of this configuration, the arithmetic processing section 140 executes processing such as four arithmetic operations, functional calculi, graph or numerical table generation, or the like according to the user's operation on the input operation section 120, and controls to display the inputted numbers or numerical expressions, calculation results, generated graphs or numerical tables, or information regarding the progress of the processing on the display section 110.

In addition, the arithmetic processing section 140 controls to generate a graph, a numerical table, or the like based on image data or measurement data retrieved from the imaging device 200, sensor devices, and the like connected through the communication circuit 130 and display it on the display section 110. Here, the information displayed on the display section 110 by the arithmetic processing section 140 has been subjected to image adjustment processing so that, when the user provides an instruction to generate a graph, a numerical table, or the like, a suitable graph, numerical table, or the like that can be easily visually recognized is generated. Note that the image adjustment processing of the displayed information (composite image) will be described later.

The memory section 150 includes a RAN (Random Access Memory) and a ROM (Read Only Memory). The RAM stores data such as numbers and numerical expressions inputted by an operation on the input operation section 120, calculation results image data received from the imaging device 200 connected to the information processing device 100, measurement data acquired from the sensor device, and graphs and numerical tables generated based on image data and measurement data. Also, the ROM stores, for example, a control program to be executed by the arithmetic processing section 140. Here, the memory section 150 may be configured such that the ROM is at least partially built into the arithmetic processing section 140, and the control program is incorporated in advance into the arithmetic processing section 140. Note that the memory section 150 may be entirely or partially in the form of a removable storage medium such as a memory card, and configured to be removable from the information processing device 100.

The power supply section 160 supplies driving electricity to each section of the information processing device 100. In a case where the information processing device 100 is a portable electronic device such as a general-purpose multifunctional scientific electronic calculator, in the power supply section 160, a general-purpose primary battery or secondary battery may be applied as an operation power source, for example. In addition, it is also possible to apply a power source utilizing an environmental power generation (energy harvest) technology which generates electricity with vibration or energy such as light, heat, or electromagnetic waves. Moreover, in a case where the information processing device 100 is an electronic device that requires a relatively large amount of electricity, such as a personal computer, a commercial power source may be applied as an operation power source, for example.

The imaging device 200 has, in addition to an imaging function for photographing positional changes of a moving object, a function to execute image processing based on captured images (composite image data generation processing including the image adjustment processing), for example. In particular, the imaging device 200 according to the present embodiment performs high-speed continuous image capturing (or high-speed still image capturing) to acquire temporal position changes of a detection or analysis target as consecutive still images captured at set time intervals, or performs high-speed moving image capturing (or high-speed image capturing) to acquire such changes as a moving image, and executes image processing on the plurality of still images or the moving image to generate the image data of a composite image expressing positional changes of the object (movement track). The generated image data including the composite image is transmitted to the information processing device 100 connected to the imaging device 200 and used for processing of generating a graph, a numerical table, or the like. Here, as the imaging device 200, for example, a general-purpose digital still camera or digital camcorder having the above imaging function and image processing function (hereinafter collectively referred to as "digital camera") may be applied. In addition thereto, it is also possible to apply a general-purpose electronic device having the imaging function and image processing function (or having installed thereon an application program corresponding to both functions), such as a smartphone or a tablet terminal. The imaging function and the image processing function of the imaging device 200 will be described in detail later.

The imaging device 200 mainly includes, for example, an imaging section 210, a display section 220, an input operation section 230, a communication I/F section (hereinafter simply referred to as "communication circuit") 240, an arithmetic processing section 250, a memory section 260 and a power supply section 270, as shown in FIG. 2. Note that sections similar to those in the above-described information processing device 100 are described in a simplified manner.

The imaging section 210 has an image sensor such as a CCD (Charge Coupled. Device) or a CMOS (Complementary Metal-oxide Semiconductor), and executes a photographing operation such that an optical image of an object (photographic subject) including a background, which has passed through the lens, is scanned and image data corresponding to one screen (frame) is acquired. This imaging section 210 according to the present embodiment repeats, based on instructions from the arithmetic processing section 250, the above-described photographing operation at set time intervals (cycles) to perform high-speed continuous image capturing, and thereby acquires consecutive still images. Also, based on instructions from the arithmetic processing section 250, the imaging section 210 performs high-speed moving image capturing, and thereby acquires a moving image. The image data of the still images or moving image acquired by the imaging section 210 is stored in the storage area of the memory section 260 described below.

Here, it is necessary that the imaging speed (frame rate; the number of frames photographed per second) of the high-speed continuous image capturing or high-speed moving image capturing that is executed by the imaging section 210 is set to be sufficiently fast relative to the moving speed of an object. This is because when a graph expressing the movement track of an object is generated based on image data acquired by the imaging section 210, there is a possibility that positional changes of the object within a short period of time are so large that the positional change cannot be sufficiently captured. In recent years among general-purpose imaging devices (digital cameras), some imaging devices are capable of high-speed image capturing where hundreds or more of frames are photographed per second, in addition to image capturing at a conventional imaging speed where 30 frames or 60 frames are photographed per second. In the present embodiment, such an imaging device capable of high-speed image capturing can be favorably applied.

The display section 220 includes a liquid crystal display (LCD), an organic electroluminescence display (OLED), or the like, and displays a live-view image of an object (photographic subject) including a background acquired by the imaging section 210 or still images or a moving image captured by the imaging section 210 and stored in the memory section 260. In addition, on the display section 220, various types of information are displayed based on an operation performed by the user through the input operation section 230, image processing in the imaging device 200 and the like.

The input operation section 230 includes, for example, button switches 22, 24, 26 and 28 constituted by hardware keys arranged on an area around the display section 220, a side portion of the housing of the imaging device 200, or the like, a touch switch 30 constituted by software keys applying a touch panel integrally formed with the display section 220, and the like, as shown in FIG. 1B and FIG. 1C. Here, in a case where a general-purpose digital camera is applied as the imaging device 200 as shown in FIG. 1B and FIG. 1C, as the input operation section 230, a shutter button for instructing the imaging section 210 to perform image capturing, a selection button for selecting an image, a set menu, or the like, a playback button for displaying a captured image or the like on the display section 220, function keys or menu keys for achieving or setting various functions such as data communication with the information processing device 100 or image processing, and the like are arranged in the form of hardware keys or software keys. For example, the shutter button has the button switch 22, the selection button has the button switch 24, the playback button has the button switch 26, and the function keys or menu keys have the button switch 28 or the touch switch 30. The user operates these switches to perform image capturing of a moving object, display captured images, or provide an instruction to perform image processing, for example.

The communication circuit 240 at least has the function to perform data communication with the information processing device 100 connected to the imaging device 200, and transmits image data or the like stored in the memory section 260 to the information processing device 100 applying the cable communication system or wireless communication system described above.

The arithmetic processing section 250 includes a processor or a computer, such as a CPU or a MPU, and executes a control program stored in the memory section 260. As a result of this configuration, based on an operation on the input operation section 230 by the user or a control signal transmitted from the information processing device 100, the arithmetic processing section 250 controls operations of each section, such as a photographing operation by the imaging section 210, an image processing operation for generating composite image data expressing the movement track of an object based on image data acquired by the photographing operation, and a data communication operation for transmitting image data and the like to the information processing device 100 in the communication circuit 240.

The memory section 260 includes a RAM and a ROM. The RAM stores the image data of consecutive still images or a moving image of an object acquired by the imaging section 210, the image data of a composite image generated based on the image data of the consecutive still images or the moving image and expressing the movement track of the object, and the like. In addition, the ROM stores, for example, a control program to be executed by the arithmetic processing section 250. Here, the memory section 260 may be configured such that the ROM is at least partially built into the arithmetic processing section 250, and the control program is incorporated in advance into the arithmetic processing section 250. In addition, the memory section 260 may be entirely or partially in the form of a removable storage medium and configured to be removable from the imaging device 200.

The power supply section 270 supplies driving electricity to each section of the imaging device 200. In the power supply section 270, a general-purpose primary battery or secondary battery may be applied as an operation power source, for example.

(Method for Controlling Learning Support Device)

Figure 4A:
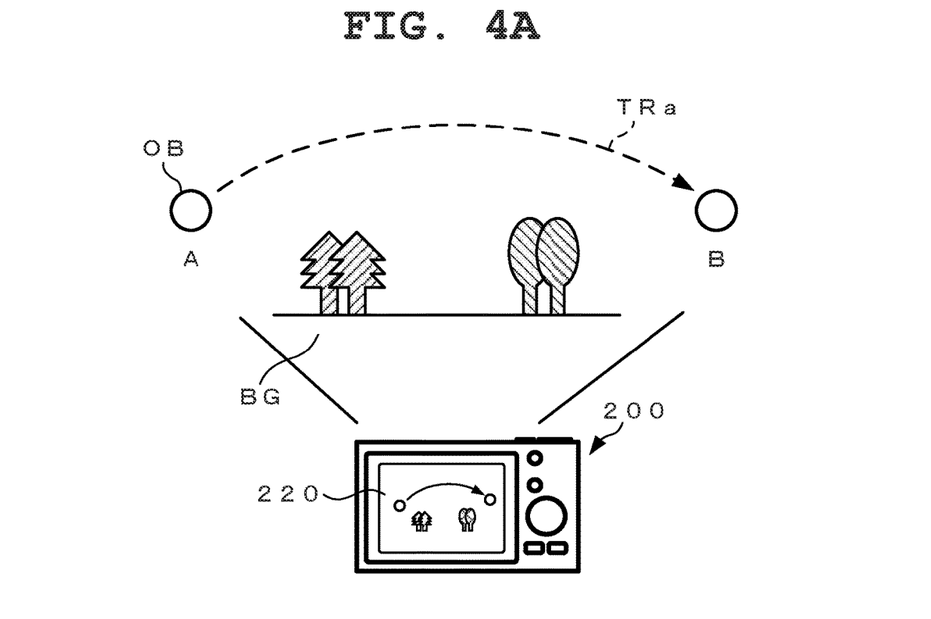
FIG. 4A and FIG. 4B are schematic diagrams showing an example of an object photographing operation using the learning support device according to the embodiment.
Figure 4B:
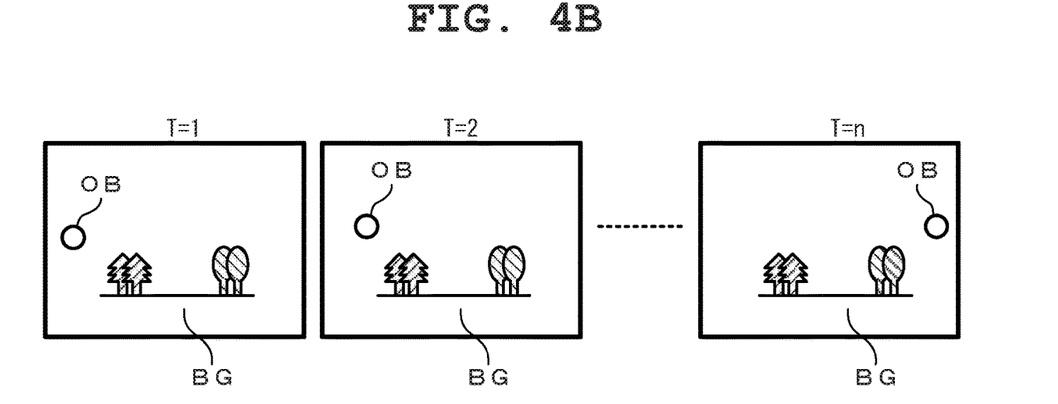

Next, the control method including the information processing method for the learning support device and the information processing program according to the present embodiment will be described with reference to the drawings. Here, a case is described where detection and analysis are performed on an event that an object moves and its position changes as a ball thrown from position A to position B, as shown in FIG. 4.

Figure 3:
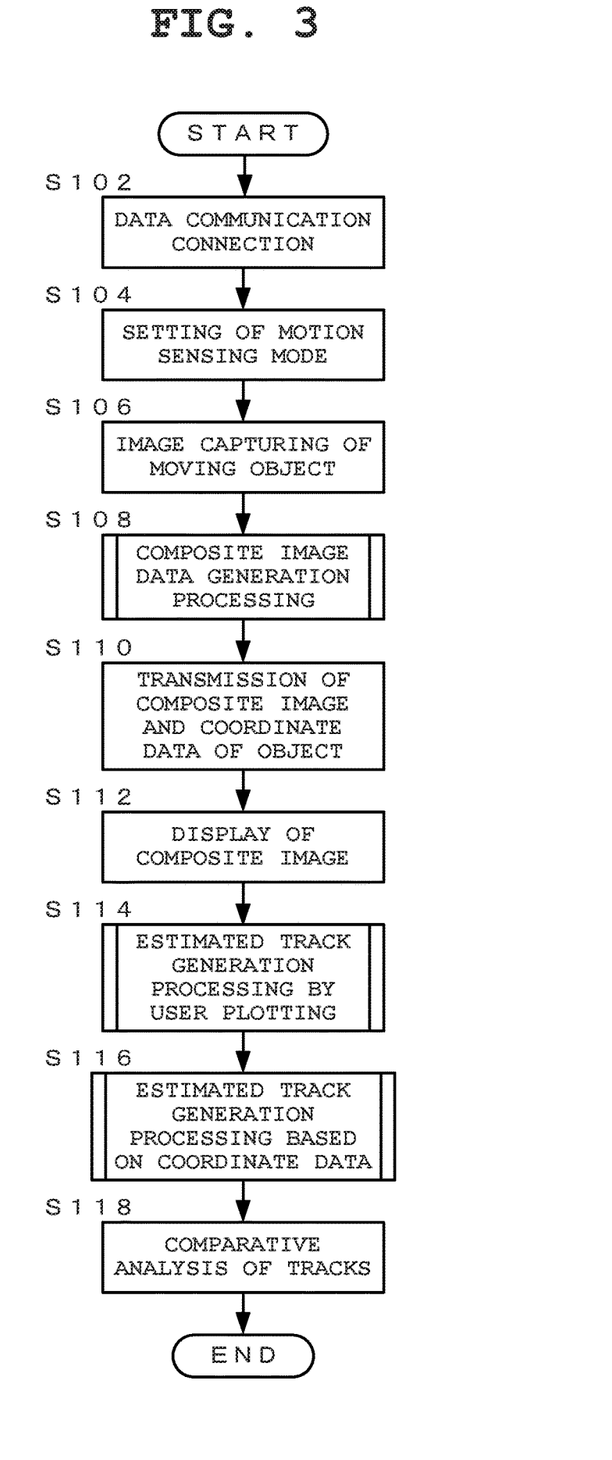
FIG. 3 is a flowchart showing an example of a method for controlling the learning support device according to the embodiment.
Figure 5A:
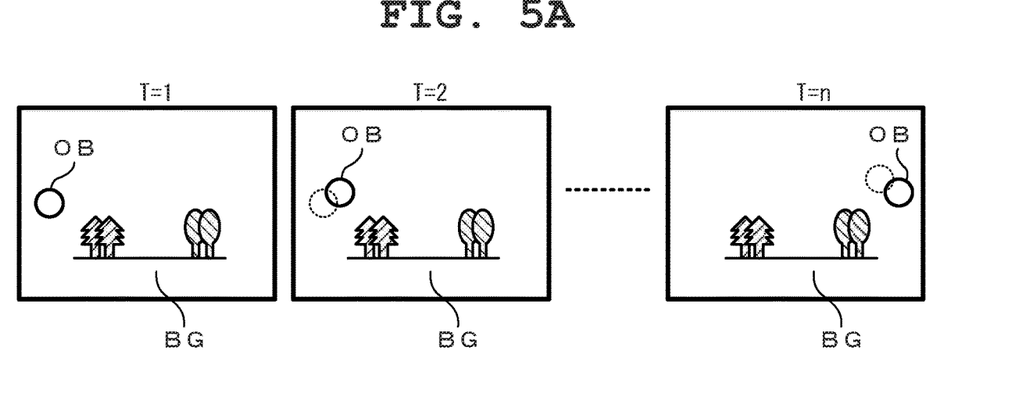
FIG. 5A, FIG. 5B and FIG. 5C are schematic diagrams for explaining composite image generation processing (including image adjustment processing) applied to the method for controlling the learning support device according to the embodiment.
Figure 5B:
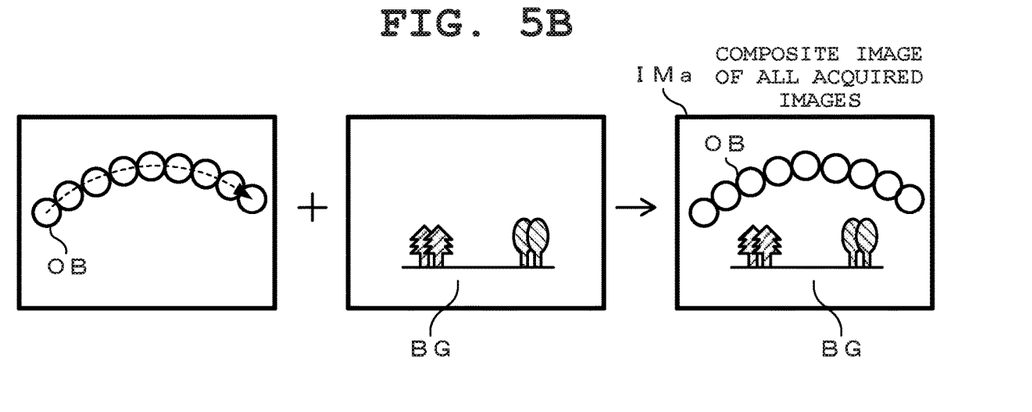
Figure 5C:
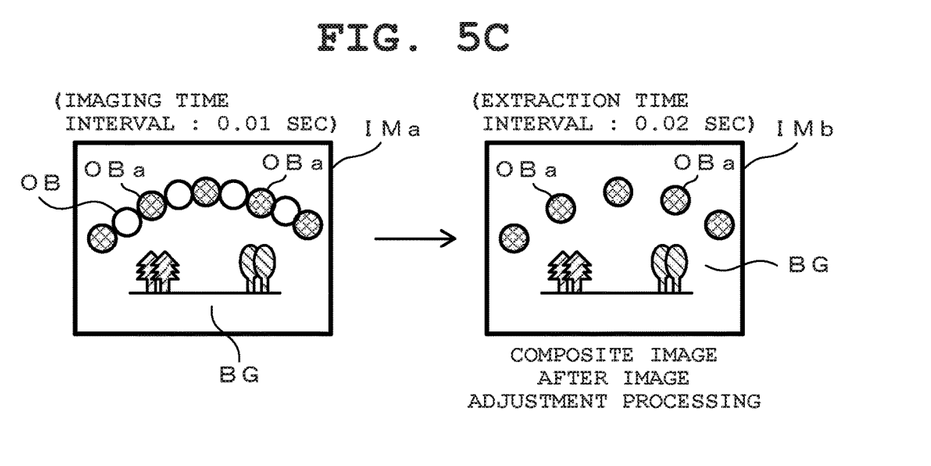
Figure 6A:
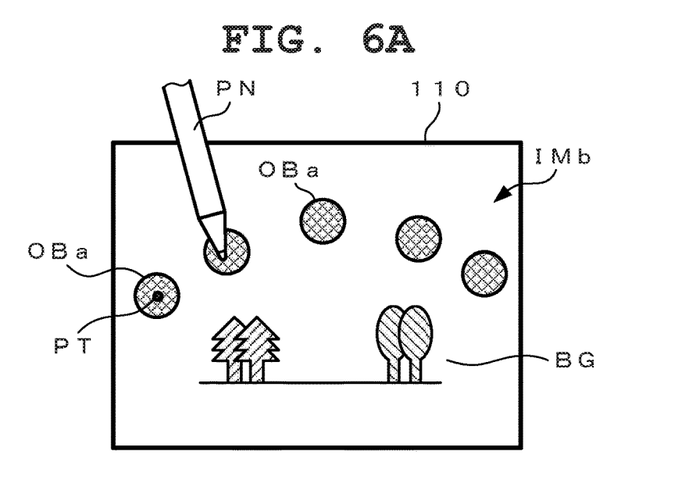
FIG. 6A, FIG. 6B and FIG. 6C are schematic diagrams for explaining estimated track generation processing applied to the method for controlling the learning support device according to the embodiment and processing for comparing an estimated track and a measured track.
Figure 6B:
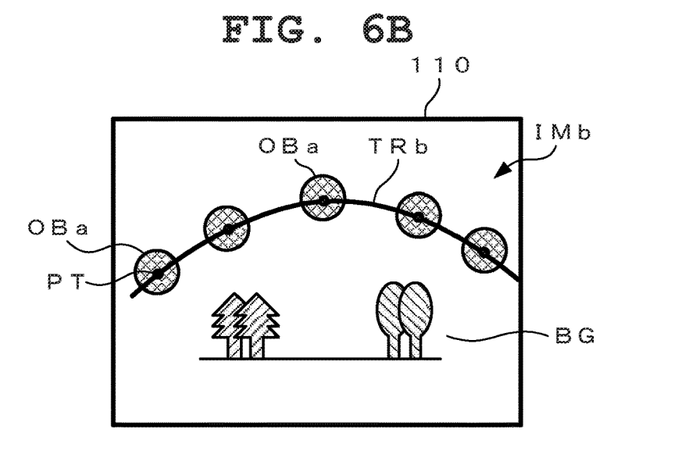
Figure 6C:
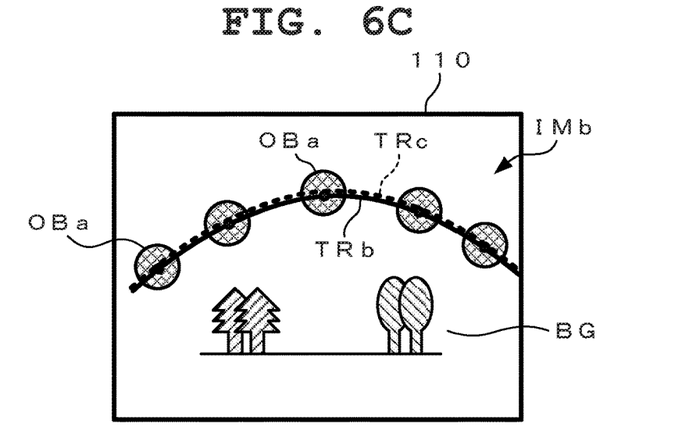

FIG. 3 is a flowchart showing an example of the method for controlling the learning support device according to the present embodiment. Also, FIG. 4A and FIG. 4B are schematic diagrams showing an example of an object photographing operation using the learning support device according to the present embodiment, FIG. 5A to FIG. 5C are schematic diagrams for explaining the composite image data generation processing (including the image adjustment processing) applied to the method for controlling the learning support device according to the present embodiment and FIG. 6A to FIG. 6C are schematic diagrams for explaining the estimated track generation processing applied to the method for controlling the learning support device according to the present embodiment and the processing of comparing an estimated track and a measured track.

In the method for controlling the learning support device according to the present embodiment, the imaging device 200 executes the processing of performing high-speed continuous image capturing or high-speed moving image capturing on a moving object to be detected or analyzed and acquiring the results as image data, and the processing of, based on the acquired image data, generating composite image data (movement track) expressing temporal changes in the position of the object (which includes the image adjustment processing). Also, the information processing device 100 executes the processing of, based on the composite image data received from the imaging device 200, computing a user estimated value (estimated track) and an actual measured value (measured track) related to the movement track of the object, and the processing of displaying the computed tracks in a comparable state. These processing operations are actualized by the arithmetic processing sections 140 and 250 of the information processing device 100 and the imaging device 200 executing specific programs.

In the method for controlling the learning support device according to the present embodiment, first, the user starts the information processing device 100 and the imaging device 200 and sets such that data communication between the information processing device 100 and the imaging device 200 can be made (Step S102), as shown in the flowchart of FIG. 3. Here, the data communication between the information processing device 100 and the imaging device 200 may be established by a communication cable being connected to both the communication circuits 130 and 240, or may be established by the user operating the input operation sections 120 and 230 to start a program for wireless communication.

Next, the user operates the input operation section 120 of the information processing device 100 so as to start a motion sensing mode in which changes in the position of a moving object are detected and analyzed (Step S104). As a result, the arithmetic processing section 140 transmits a mode signal to notify a mode of the information processing device 100 to the imaging device 200 via the communication circuit 130.

When the arithmetic processing section 250 of the imaging device 200 receives the mode signal from the information processing device 100 via the communication circuit 240, a control signal is outputted to the imaging section 210. As a result, the arithmetic processing section 250 executes high-speed continuous image capturing or high-speed moving image capturing at a set imaging speed (frame rate) with, for example, an object OB moving from position A to position B and its background BG as a photographic subject (Step S106), as shown in FIG. 4A.

The photographing operations by the imaging section 210 herein may be performed such that, based on the control signal outputted from the arithmetic processing section 250, image capturing is started at specific timing (e.g., 10 seconds after the reception of the control signal) and performed at a predetermined imaging speed (frame rate) for a predetermined amount of imaging time. Also, it may be performed such that timing to start image capturing is determined by the user with a shutter button or the like. Moreover, in a case where the imaging device 200 has a function for detecting a moving object, it may be performed such that image capturing is started by the motion of an object being detected. Note that, before the photographing operations, the user adjusts and checks a positional relationship between the object OB and the imaging device 200, the viewing angle of the imaging section 210, and the like based on images displayed on the display section 220 so that the positional changes of the moving object OB are entirely or partially included within the imaging range of the imaging section 210, as shown in FIG. 4A.

As a result of the photographing operations, the image data of a plurality of consecutive still images or a moving image acquired at clock times T=1, 2, . . . , n (n is the serial number of the last image within the imaging time) at regular time intervals (first time intervals) is stored in the storage area of the memory section 260, as shown in FIG. 4B.

Next, after the completion of the photographing operations, based on the acquired image data, the arithmetic processing section 250 of the imaging device 200 executes the composite image data generation processing of generating composite image data expressing the movement track of the object (corresponding to "TRa" shown in FIG. 4A) (Step S108).

Specifically, the arithmetic processing section 250 reads out the plurality of still images or the plurality of frames of the moving image captured at the consecutive clock times at the regular time intervals and stored in the memory section 260, and compares the images or frames captured at the consecutive clock times with each other to extract displacement included therein as characteristic points (data of coordinates on a x-y plane), as shown in FIG. 5A. Here, the extracted characteristic points correspond to the positional changes of the moving object OB, and the images of the object OB corresponding to the characteristic points and their position data (e.g., data of the barycentric coordinates of the object OB) are stored in the storage area of the memory section 260 in association with each other.

In addition, during the comparison of the plurality of still images or the plurality of frames of the moving image captured at the consecutive clock times at the regular time intervals, the arithmetic processing section 250 judges common image components excluding the object OB constituting the characteristic points (displacement) in the images as a background BG, and stores the image data thereof in the storage area of the memory section 260.

Next, the arithmetic processing section 250 reads out the images of the object OB constituting the characteristic points, their position data, and the image data of the background BG from the memory section 260, and arranges them such that the images of the object OB are superimposed on the coordinates of the respective characteristic points on the image of the background BG, as shown in FIG. 5B. As a result, a composite image IMa is generated in which the images of the object OB have been arranged along its movement track TRa in one scene (i.e., one still image or one frame). The image data of the generated composite image IMa is stored in the storage area of the memory section 260.

Here, in the above-described composite image data generation process, characteristic points are extracted from all the images acquired by the photographing operations in the imaging section 210 so as to generate the composite image IMa. Therefore, in a case where the moving speed of the object OB serving as a photographic subject is excessively lower than the imaging speed set in the imaging section 210, the number of images acquired by the photographing operations or the volume of the position data of the object OB extracted as characteristic points may be enormous relative to its positional changes. In this case, the transmission time of the data to the information processing device 100 is longer than necessary, or the images of the object OB displayed on the composite image IMa excessively overlap with each other or overcrowd, whereby the position of each image of the object OB is difficult to be visually recognized.

Thus, in the present embodiment, when a judgment is made that the images of the object OB on the composite image IMa excessively overlap with each other due to the moving speed of the object OB serving as a photographic subject, and are difficult to be recognized, the arithmetic processing section 250 executes the composite image data processing of setting each time interval for extracting the already-captured images to a regular time interval (e.g., 0.02 sec; second time interval) that is longer than each time interval between consecutive images or frames which is defined by the imaging speed of the imaging section 210 (e.g., 0.01 sec), and thereby reduces the number of object portions to be extracted so that it is smaller than the number of the object portions currently on the composite image IMa, as shown in FIG. 5C. Then, based on object portions OBa acquired by some of the portions showing the object OB being eliminated and their position data, the composite processing is performed again. As a result, an adjusted composite image IMb is generated in which the object portions OBa have been arranged at substantially equal intervals (spacing distance) so that the positions of the object and their changes can be visually recognized easily. In the present embodiment, the processing where the arrangement of the images of the object OB is adjusted by re-extraction being performed after some of the characteristic points being eliminated is referred to as "image adjustment processing".

Note that this image adjustment processing is favorably performed when, in the composite image IMa generated in the composite image data generation processing, the images of the object OB excessively overlap with each other and are difficult to be recognized. Therefore, the arithmetic processing section 250 may judge whether to execute the image adjustment processing based on a comparison between the moving speed of the object OB and the imaging speed, a distance between portions showing the object OB which have been captured at the consecutive clock times and extracted as characteristic points, and the like.

Next after the generation of the composite image IMa or IMb, the arithmetic processing section 250 transmits the image data of the composite image IMb acquired by the elimination, all the position data of the object portions OBa constituting the characteristic points of the composite image IMb, and arbitrary position data of the object OB that has not been used for the generation of the composite image IMb to the information processing device 100 via the communication circuit 240 (Step S110). The position data is the data of two-dimensional coordinate values on a x-y plane, and thus its data volume is extremely smaller than the composite image IMb. Therefore, there is almost no effect of transmission delay. Note that the position data of the object OB to be transmitted may be all the position data of the characteristic points of the composite image IMa or may be position data whose data volume is smaller than that of all the position data of the characteristic points of the composite image IMa.

That is, when the image adjustment processing described above is executed, the arithmetic processing section 250 transmits the data of positions whose number is larger than the number of the object portions OBa constituting the characteristic points on the composite image IMb re-extracted by the image adjustment processing to the information processing device 100 together with the image data of the composite image IMb. Specifically, for example, when the data volume of the position data of the object OS included in all the images acquired by the photographing operations by the imaging section 210 is smaller than a set threshold value, the position data of the object OS included in all the acquired images and the image data of the composite image IMb are transmitted to the information processing device 100. When the data amount of the position data of the object OB included in all the images acquired by the photographing operations by the imaging section 210 is equal to or greater than the set threshold value, all the position data of the object portions OBa used for the generation of the composite image IMb and, among the position data of the object OB that has not been used for the generation of the composite image IMb, the position data of the object OB extracted at arbitrary time intervals are transmitted to the information processing device 100 together with the image data of the composite image IMb, as position data having a smaller data volume than the position data of the object OS included in all the acquired images. Also, in a case where the position data of each characteristic point of the composite image IMa has a change point, such as the local maximum or local minimum, the position data of the object OS to be transmitted is set to include the position data of the object OB at the change point.

Next, through the communication circuit 130, the arithmetic processing section 140 of the information processing device 100 receives the image data of the composite image IMb from the imaging device 200, all the position data of the object portions OBa constituting the characteristic points of the composite image IMb, and other position data of the object OB. Then, the arithmetic processing section 140 stores them in the storage area of the memory section 150 and displays the composite image IMb on the display section 110 (Step S112). FIG. 6A shows the composite image IMb that has been subjected to the image adjustment processing so that the positions of the object portions OBa and the changes will be easily visually recognized in the processing of generating the estimated track of the object described below.

Then, based on the composite image IMb displayed on the display section 110 of the information processing device 100, the user plots the positions of the object portions OBa on the display section 110. Then, the arithmetic processing section 140 performs linear regression according to the plotted points, and thereby executes the estimated track generation processing that calculates a numerical expression X indicating an estimated track (regression line) TRb estimated as the movement track of the moving object OS (Step S114). The estimated track TRb of the object OB generated by the graphing function of the information processing device 100 and the computed numerical expression X of the estimated track TRb are stored in the storage area of the memory section 150.

Specifically, as shown in FIG. 6A, the user plots the plurality of positions of the object portions OBa in the composite image IMb displayed on the display section 110 by touching with a stylus pen PN, a fingertip, or the like, whereby the arithmetic processing section 140 performs linear regression, such as the least-squares method, from the plotted points so as to calculate the numerical expression X. Then, the arithmetic processing section 140 superimposes the estimated track TRb derived from the numerical expression X on the composite image IMb and displays it on the display section 110 as shown in FIG. 6B. Here, the estimated track TRb is not necessarily required to pass through the barycentric coordinates of the object portions OBa.

Next, based on the position data which have been received from the imaging device 200 and whose number is larger than the number of object portions OBa and, the arithmetic processing section 140 performs linear regression, such as the least-squares method, and calculates a numerical expression Y. Then, the arithmetic processing section 140 executes the estimated track generation processing in which an estimated track TRc (dashed line in the drawing) derived from the numerical expression Y is superimposed on the composite image IMb together with the estimated track TRb, and displayed on the display section 110 (Step S116), as shown in FIG. 6C. The estimated track TRc of the object OB generated by the graphing function of the information processing device 100 and the numerical expression Y are stored in the storage area of the memory section 150.

That is, the arithmetic processing section 140 generates the estimated track TRc using the numerical expression Y calculated based on the position data of the object OB included in all the images acquired by the photographing operation by the imaging device 200 or the data of an arbitrary number of positions of the object OS including all the position data of the object portions OBa used for the generation of the composite image IMb (data of barycentric coordinates). Therefore, it is highly probable that the estimated track TRc is closer to the true value than the estimated track TRb derived from the numerical expression X.

Next, at Step S118, the user visually recognizes the image acquired by the estimated track TRb estimated by plotting by the user and the estimated track TRc estimated based on the position data being superimposed on the composite image IMb displayed on the display section 110 of the information processing device 100. As a result, the accuracy of plotting by the user relative to the positional changes of the moving object OB can be directly compared and analyzed with a graph or a numerical expression through the vision. Here, in the case where the estimated track TRb is distant from the estimated track TRc, the user may delete the estimated track TRb and then perform plotting again to generate the estimated track TRb again. In addition, the estimated track TRb may be generated by each position between adjacent object portions OBa being plotted without the positions of the object portions Oba being plotted.

As such, according to the learning support device of the present embodiment, the amount of data transmitted or received is suppressed. Therefore, a composite image, a numerical expression based on the composite image, and a track derived from the numerical expression can be displayed quickly, which makes it possible to appropriately deepen mathematical understanding through experiences such as the grasp of the characteristics of the movement track of an object when the object changes its position or how changes in the coefficient of a numerical expression are reflected in the image of the track.

Next, the adjustment processing is described which is applicable to the composite image data generation processing that is executed in the method for controlling the learning support device (information processing method) according to the above-described embodiment.

Figure 7A:
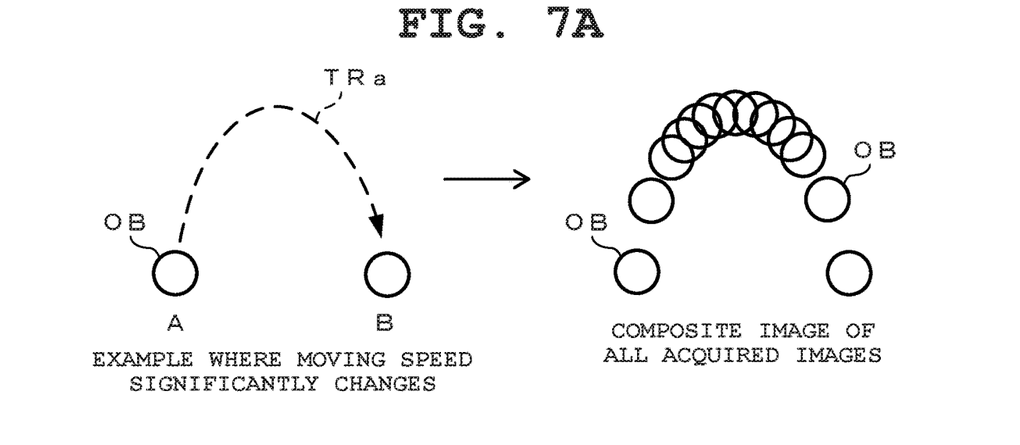
FIG. 7A, FIG. 7B and FIG. 7C are schematic diagrams for explaining the adjustment processing applied to the composite image generation processing according to the embodiment.
Figure 7B:
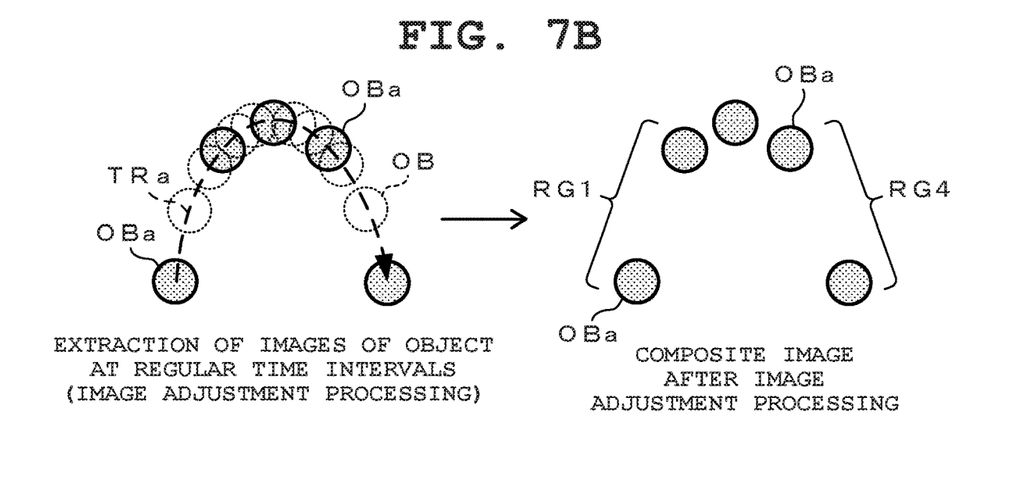
Figure 7C:
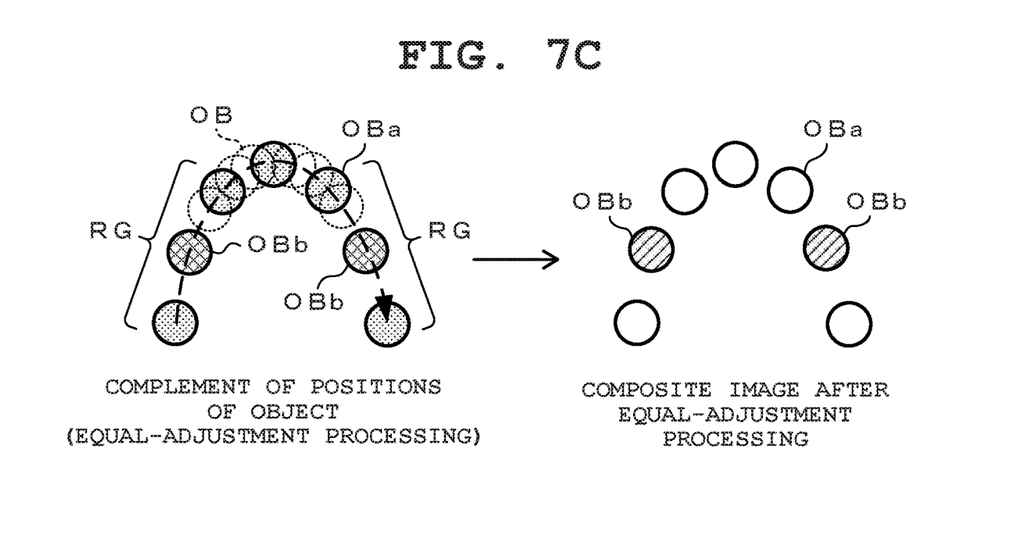

FIG. 7A to FIG. 7C are schematic diagrams for explaining the adjustment processing applied to the composite image generation processing according to the present embodiment. Note that sections that are the same as those in the above-described embodiment are provided with the same reference numerals and described in a simplified manner.

In the above-described embodiment, in the case where the ball serving as the object OB is thrown from position A to position B under gravity as shown in FIG. 4A, the number of images acquired during an imaging period and the number of images or positions of the object OB arranged on the above-described composite image differ depending on the shape of the movement track TRa of the object OB or the difference in the moving speed.

For example, in the case where the ball serving as the object OB is thrown to have a movement track that is substantially linear in the horizontal direction or a movement track having a low arch shape at the initial velocity V, the moving speed of the object OB is maintained substantially constant or within a constant range. Accordingly, in the composite image IMa or IMb, a plurality of images of the object OB or the object portions OBa extracted at regular time intervals are arranged at substantially equal intervals (spacing distance), as shown in FIG. 4A, FIG. 4B and FIG. 5A to FIG. 5C. On the other hand, in a case where the ball serving as the object OB is thrown to have a movement track going up and down in a substantially vertical direction (height direction) or a movement track having a high arch shape at the initial velocity V, the moving speed of the object OB significantly changes from the initial velocity V to, for example, a speed sufficiently lower than the initial velocity V. Accordingly, as shown in FIG. 7A and FIG. 7B, the intervals (spacing distance) between the plurality of images of the object OB or the object portions OBa extracted at the regular time intervals are unequal. Therefore, when the user generates the estimated track of the object OB based on the composite image in the estimated track generation processing the positional changes of the object OBa may be difficult to be recognized.

Thus, in the present embodiment, when performing the composite image data generation processing in the imaging device 200, the arithmetic processing section 250 monitors for the moving speed of the object OB and, based on a minimum value (minimum moving speed), judges whether the object OB has been thrown to have a movement track that is linear in a substantially horizontal direction or having a low arch shape (i.e., a state where the object OB has been thrown) or has been thrown to have a movement track that goes up and down in a substantially vertical direction or having a high arch shape. Then, according to a judgment result, the arithmetic processing section 250 adjusts the positions and the number of images of the object OB to be arranged in a composite image. In the present embodiment, the processing of adjusting the arrangement of images of the object OB in a composite image based on a difference in the moving speed or movement track of the object OB is referred to as "equal-adjustment processing." Here, the minimum moving speed of the object OB is calculated based on an imaging speed (frame rate) and an imaging time set in the imaging section 210 and positional changes of the object OB constituting characteristic points in a plurality of consecutive images acquired. The moving speed herein may be an actual speed per hour (unit: km/hr) or may be the number of pixel dots for the positional changes of the object OB per unit time in the display section 110 having a plurality of pixel dots (unit; dot/msec).

Specifically, in a case where the minimum moving speed of the object OB in all the acquired images is higher than a preset threshold value V1, the arithmetic processing section 250 judges that the object OB has been thrown at a substantially constant speed to have a movement track that is linear in a substantially horizontal direction or having a low arch shape (the object OB has been thrown) as shown in FIG. 4A, and thus the positional changes of the images of the object OB per unit time are substantially equal. In this case, as to images of the object to be arranged in a composite image, the arithmetic processing section 250 extracts and arranges images of the object such that a movement track is expressed which has coordinates that reach the local maximum in the vertical direction (picture vertical direction or y-axis direction; up-and-down direction in the drawing) (local-maximum coordinates) and has a low arch shape that is substantially line-symmetric in the horizontal direction (picture horizontal direction or x-axis direction; right-and-left direction in the drawing) about the image of the object arranged at such coordinates (see "composite image after the image adjustment processing" in the drawing), as shown in FIG. 5C.

In this composite image, the images of the object are placed at substantially equal intervals on the movement track of the object. Therefore, the user can appropriately grasp the characteristics of the movement track of the object (i.e., positional changes) through the vision, and appropriately perform the plotting operation and the like for generating an estimated track of the object.

On the other hand, in a case where the minimum moving speed of the object OB in an acquired image is equal to or lower than the preset threshold value V1, the arithmetic processing section 250 judges that the moving speed of the object OB has significantly decreased, the object OB has been thrown to have a movement track that goes up and down in a substantially vertical direction or has a high arch shape, and thus the positional changes of the images of the object OB per unit time are unequal, as shown in FIG. 7A. Here, if a plurality of object portions OBa are extracted at equal time intervals as in FIG. 5C, they are arranged such that a movement track is expressed which has coordinates that reach the local maximum in the vertical direction (up-and-down direction in the drawing) (local-maximum coordinates) and has a high arch shape that is substantially line-symmetric in the horizontal direction (right-and-left direction in the drawing) about the image of the object placed at such coordinates (see "composite image after the image adjustment processing" in the drawing), as shown in FIG. 7B.

In this composite image, the moving speed of the object significantly changes from the initial velocity V to the minimum moving speed near a change point such as the local maximum point. Accordingly, the intervals between the arranged images of the object (spacing distance) are significantly unequal. That is, due to the difference in the moving speed of the object, an area RG is formed in which an interval between images of the object arranged on the movement track is excessively large. Accordingly, the user may not appropriately grasp the track of the positional changes of the object, or the arithmetic processing section 140 calculates a numerical expression different from the actual conditions.

In the adjustment processing applied to the present embodiment, in the case where changes in the moving speed of the object are significantly unequal, the arithmetic processing section 250 sets an image extraction time interval for areas other than the area RG at, for example, 0.1 sec, as shown in FIG. 7C. In addition, an image extraction time interval for an area where the moving speed of the object is equal to or higher than a threshold value V2 that is higher than a threshold value V1 or an area around the coordinates at which the moving speed reaches the maximum (corresponding to the area RG) is set to be shorter than the extraction time interval for the areas other than the area RG (e.g., 0.05 sec). Then, images of object portions OBb constituting characteristic points and their position data are additionally extracted, and an arrangement operation is performed such that the intervals (spacing distance) between the images of the object portions OBa and OEb displayed on the composite image are substantially equal. Here, for the extraction of the images of the object portions OBb, the time interval in the area RG and the time interval in an area outside the area RG are each a regular time interval. However, the invention is not limited thereto, and a configuration may be adopted in which the extraction time interval is longer as the position coordinates get closer to the extreme. In addition, the extraction is not required to be performed using the time intervals, and a configuration may be adopted in which, based on the data of each position of the object OB acquired, a plurality of images of the object portions OBa are extracted such that the object portions OBa do not overlap with each other and the spacing distances between the object portions OBa are substantially equal. In any of these configurations, it is preferable that the data of the position of the extreme or a position closest to the extreme is extracted first, and then coordinates are extracted to be symmetrical about the extracted coordinates.

In the composite image subjected this adjustment processing, the images of the object are arranged at substantially equal intervals on the movement track of the object. Therefore, it is easy for the user to appropriately grasp the characteristics of the movement track of the object (i.e., positional changes) through the vision. In addition, the arithmetic processing section 140 calculates a numerical expression close to the actual condition, which makes it possible to generate a more accurate movement track.

Accordingly, in the present embodiment, the image data of a composite image generated after some images being eliminated and the position data of the object are transmitted by the imaging device 200 to the information processing device 100 and displayed on the display section 110. As a result of this configuration, the amount of data transmitted from the imaging device 200 to the information processing device 100 can be suppressed. Also, composite image data that allows the user, who generates an estimated track of an object based on a composite image in the information processing device 100, to appropriately grasp the characteristics of the movement track of the object can be generated in the imaging device 200. As a result of this configuration, processing loads on the information processing device 100 can be reduced. Further, in addition to the position data of an object that has been used for the generation of composite image data in the imaging device 200, position data that has not been used for the generation of the composite image is also transmitted to the information processing device 100, whereby the track of the object is specified in further detail. As a result, the degree of difference from the user's estimated value of the positional changes of the object can be accurately compared and analyzed through the vision, and the user can appropriately perform mathematical learning.

In the embodiment described above, a general-purpose multifunctional scientific electronic calculator is applied as the information processing device 100, and a general-purpose digital camera is applied as the imaging device 200. However, the present invention is not limited thereto, and the information processing device 100 and the imaging device 200 may be an electronic device having each function of them or having installed thereon an application program corresponding to both functions. That is, the learning support device according to the present invention is not limited to a device actualized by separate bodies of an information processing device and an imaging device, and may be actualized by a single electronic device having their functions, such as a smartphone, a tablet terminal, or the like. In this case, among the functional blocks shown in FIG. 2, the display sections 110 and 220, the input operation sections 120 and 230, the arithmetic processing sections 140 and 250, the memory sections 150 and 260, and the power supply sections 160 and 270 are each shared (used in common), and the communication circuits 130 and 240 are omitted or their functions are partially simplified.

Also, in the above-described embodiment, an imaging device has been applied as the data acquisition device. However, the present invention is not limit thereto, and a configuration may be adopted in which a data acquisition device includes a distance measurement sensor that measures relative positions of a moving object, and an arithmetic processing section that eliminates some of a plurality of position data including displacement in accordance with a mode communication signal received from an information processing device and generates position data that are not consecutive, and transmits the non-consecutive position data to the information processing device.

While the present invention has been described with reference to the preferred embodiments, it is intended that the invention be not limited by any of the details of the description therein but includes all the embodiments which fall within the scope of the appended claims.

What is claimed is:

1. A data processing method for a data acquisition device having an image sensor, the method comprising:
   performing image capturing of a moving object at first time intervals using the image sensor;
   generating (i) composite image data indicating positional changes of the object from image data acquired by eliminating some of a plurality of image data captured by the image sensor at the first time intervals, in accordance with a mode signal from an information processing device, (ii) first position data indicating positions of the object in the composite image data, and (iii) second position data indicating positions of the object which are not included in the composite image data; and
   transmitting the composite image data, the first position data, and the second position data to the information processing device.

2. A data processing method for a data acquisition device having an image sensor, the method comprising:
   performing image capturing of a moving object at first time intervals using the image sensor;
   generating composite image data indicating positional changes of the object from image data acquired by eliminating some of a plurality of image data captured by the image sensor at the first time intervals, in accordance with a mode signal from an information processing device; and
   transmitting the composite image data to the information processing device,
   wherein the eliminating comprises extracting, from the plurality of image data captured at the first time intervals, image data corresponding to second time intervals longer than the first time intervals.

3. The data processing method according to claim 2, further comprising generating position data indicating positions of the object in the composite image data, and transmitting the position data to the information processing device.

4. A data processing method for a data acquisition device having an image sensor, the method comprising:
   performing image capturing of a moving object at first time intervals using the image sensor;
   generating composite image data indicating positional changes of the object from image data acquired by eliminating some of a plurality of image data captured by the image sensor at the first time intervals, in accordance with a mode signal from an information processing device; and
   transmitting the composite image data to the information processing device,
   wherein the eliminating comprises extracting, from the plurality of image data captured at the first time intervals, image data located at positions where distances between object portions are substantially equal and the object portions do not overlap with each other.

5. The data processing method according to claim 4, further comprising generating position data indicating positions of the object in the composite image data, and transmitting the position data to the information processing device.

6. A non-transitory computer-readable recording medium storing a program for a processor of a data acquisition device having an image sensor, the program being executable by the processor to control the data acquisition device to execute processing comprising:

performing image capturing of a moving object at first time intervals using the image sensor;

generating (i) composite image data indicating positional changes of the object from image data acquired by eliminating some of a plurality of image data captured by the image sensor at the first time intervals, in accordance with a mode signal from an information processing device, (ii) first position data indicating positions of the object in the composite image data, and (iii) second position data indicating positions of the object which are not included in the composite image data; and transmitting the composite image data, the first position data, and the second position data to the information processing device.

\* \* \* \* \*